(12) United States Patent
Park

(10) Patent No.: US 9,523,383 B2
(45) Date of Patent: Dec. 20, 2016

(54) VARIABLE THREAD FASTENER

(71) Applicant: SIMPSON STRONG-TIE COMPANY, INC., Pleasanton, CA (US)

(72) Inventor: Jeremy Scott Park, Bethpage, TN (US)

(73) Assignee: SIMPSON STRONG-TIE COMPANY, INC., Pleasanton, CA (US)

( * ) Notice: Subject to any disclaimer, the term of this patent is extended or adjusted under 35 U.S.C. 154(b) by 0 days.

(21) Appl. No.: 14/493,029

(22) Filed: Sep. 22, 2014

(65) Prior Publication Data

US 2015/0010374 A1  Jan. 8, 2015

Related U.S. Application Data

(63) Continuation-in-part of application No. 13/850,606, filed on Mar. 26, 2013.

(51) Int. Cl.
*F16B 25/10* (2006.01)
*F16B 25/00* (2006.01)

(52) U.S. Cl.
CPC ....... *F16B 25/0052* (2013.01); *F16B 25/0057* (2013.01); *F16B 25/0063* (2013.01); *F16B 25/0073* (2013.01)

(58) Field of Classification Search
CPC ..... F16B 25/10; F16B 25/103; F16B 25/0052; F16B 25/0057; F16B 25/0063; F16B 25/0073
USPC ................... 411/386, 387.1, 387.2, 399, 411
See application file for complete search history.

(56) References Cited

U.S. PATENT DOCUMENTS

| | | | |
|---|---|---|---|
| 373,074 A | 11/1887 | Jones |
| 430,236 A | 6/1890 | Rogers |
| 470,804 A | 3/1892 | Jones |
| 684,774 A | 10/1901 | Baggs |
| 867,552 A | 10/1907 | Bradford et al. |
| 1,396,455 A | 11/1921 | Moore |
| 1,830,554 A | 11/1931 | McMullin |
| 2,263,137 A | 11/1941 | Oestereicher |
| 3,258,797 A | 7/1966 | Budd |
| 3,478,369 A | 11/1969 | Joseph |

(Continued)

FOREIGN PATENT DOCUMENTS

| | | |
|---|---|---|
| AU | 494077 | 10/1977 |
| CA | 2647663 A1 | 6/2010 |

(Continued)

OTHER PUBLICATIONS

Schmid Schrauben Hainfeld GMBH, Rapid Komprex, retrieved from website on Sep. 14, 2013: http://www.schrauben.at/files/rapid_komprex.pdf.

(Continued)

*Primary Examiner* — Roberta Delisle
(74) *Attorney, Agent, or Firm* — Vierra Magen Marcus LLP

(57) ABSTRACT

A fastener includes a shank having a first end and a second end. A first portion of a thread is formed with a first, symmetric thread angle and a second portion of the thread is formed with a second, asymmetric thread angle. The thread may be serrated or jagged over one or more portions of the fastener, including the area of the symmetric thread angle. A blunt end comprises the leading end of the fastener.

19 Claims, 10 Drawing Sheets

(56) References Cited

U.S. PATENT DOCUMENTS

| | | | |
|---|---|---|---|
| 3,478,639 A | 11/1969 | Gruca | |
| 3,682,507 A | 8/1972 | Waud | |
| 3,706,843 A | 12/1972 | Laub | |
| 3,903,784 A | 9/1975 | Dekker | |
| 4,016,795 A | 4/1977 | Gill | |
| 4,034,641 A | 7/1977 | Williams, Jr. et al. | |
| 4,541,270 A | 9/1985 | Hanslik | |
| 4,653,244 A | 3/1987 | Farrell | |
| 4,655,661 A | 4/1987 | Brandt | |
| 4,834,602 A | 5/1989 | Takasaki | |
| 4,874,278 A | 10/1989 | Kawashita | |
| 4,878,793 A | 11/1989 | Hewison | |
| 5,015,134 A | 5/1991 | Gotoh | |
| 5,044,855 A * | 9/1991 | Fukubayashi | F16B 25/0021 411/386 |
| 5,046,905 A | 9/1991 | Piacenti et al. | |
| 5,171,186 A | 12/1992 | Lukes | |
| 5,199,839 A * | 4/1993 | DeHaitre | F16B 23/0076 411/387.3 |
| 5,209,753 A | 5/1993 | Biedermann et al. | |
| 5,482,418 A * | 1/1996 | Giannuzzi | E04D 3/3603 411/184 |
| 5,509,370 A | 4/1996 | Kovacs et al. | |
| 5,516,248 A | 5/1996 | DeHaitre | |
| 5,536,127 A | 7/1996 | Penning | |
| 5,551,818 A | 9/1996 | Koppel | |
| 5,772,376 A | 6/1998 | Konig | |
| 5,779,417 A * | 7/1998 | Barth | F16B 25/0021 411/399 |
| 5,895,187 A | 4/1999 | Kuo-Tai | |
| 5,897,280 A * | 4/1999 | Dicke | F16B 25/0015 411/386 |
| 5,987,837 A | 11/1999 | Nelson | |
| 6,000,892 A | 12/1999 | Takasaki | |
| 6,050,765 A | 4/2000 | McGovern et al. | |
| 6,056,491 A | 5/2000 | Hsu | |
| 6,086,302 A * | 7/2000 | Gerhard | F16B 25/0026 411/387.4 |
| 6,086,303 A | 7/2000 | Fluckiger | |
| 6,109,850 A | 8/2000 | Commins | |
| 6,142,719 A | 11/2000 | Daublinger et al. | |
| 6,227,430 B1 | 5/2001 | Rosen et al. | |
| 6,250,866 B1 | 6/2001 | Devine | |
| 6,296,433 B1 * | 10/2001 | Forsell | F16B 25/00 411/386 |
| 6,302,631 B1 | 10/2001 | Takasaki et al. | |
| 6,328,516 B1 | 12/2001 | Hettich | |
| 6,332,741 B1 | 12/2001 | Janusz | |
| 6,394,723 B1 | 5/2002 | Cassel | |
| 6,514,026 B1 | 2/2003 | Gerhard | |
| 6,558,097 B2 | 5/2003 | Mallet et al. | |
| 6,616,391 B1 | 9/2003 | Druschel | |
| 6,644,904 B2 | 11/2003 | Chen et al. | |
| 6,666,638 B2 | 12/2003 | Craven | |
| 6,698,987 B1 | 3/2004 | Dicke | |
| 6,854,942 B1 | 2/2005 | Hargis | |
| 6,941,635 B2 | 9/2005 | Craven | |
| 6,976,818 B2 * | 12/2005 | Levey | F16B 39/30 411/310 |
| 7,037,059 B2 * | 5/2006 | Dicke | F16B 5/0275 411/399 |
| 7,090,453 B2 | 8/2006 | Lin | |
| 7,293,947 B2 * | 11/2007 | Craven | F16B 35/065 411/387.2 |
| 7,402,016 B2 | 7/2008 | Yin-Feng | |
| 7,604,445 B1 | 10/2009 | Dicke | |
| 7,740,435 B2 * | 6/2010 | Gstach | F16B 25/0052 411/386 |
| 7,862,279 B2 | 1/2011 | Stiebitz et al. | |
| RE42,207 E * | 3/2011 | Janusz | F16B 25/00 411/309 |
| 8,182,185 B2 * | 5/2012 | Gahn | F16B 25/0026 411/386 |
| 8,182,186 B2 * | 5/2012 | Huber | F16B 25/0026 411/386 |
| 8,348,571 B2 * | 1/2013 | Shih | F16B 25/0015 411/386 |
| 8,360,702 B2 * | 1/2013 | Yu | F16B 25/0015 411/386 |
| 2002/0114682 A1 * | 8/2002 | Forster | F16B 25/00 411/411 |
| 2003/0026675 A1 | 2/2003 | McGovern et al. | |
| 2003/0235483 A1 | 12/2003 | Chen | |
| 2004/0141827 A1 | 7/2004 | Dicke | |
| 2004/0197139 A1 | 10/2004 | McGovern et al. | |
| 2005/0079031 A1 * | 4/2005 | Mizuno | F16B 25/0031 411/387.4 |
| 2006/0269380 A1 | 11/2006 | Yin-Feng | |
| 2007/0055236 A1 | 3/2007 | Hudgins et al. | |
| 2007/0128001 A1 | 6/2007 | Su | |
| 2007/0166124 A1 * | 7/2007 | Hsu | F16B 25/0015 411/387.1 |
| 2007/0217887 A1 | 9/2007 | Lin | |
| 2007/0224019 A1 | 9/2007 | Hale | |
| 2007/0286701 A1 * | 12/2007 | Hsu | F16B 25/0015 411/387.1 |
| 2008/0080951 A1 | 4/2008 | Liu | |
| 2009/0092463 A1 * | 4/2009 | Oberndorfer | F16B 25/0052 411/386 |
| 2009/0112269 A1 | 4/2009 | Lieberman et al. | |
| 2009/0162165 A1 | 6/2009 | Chen | |
| 2010/0047035 A1 | 2/2010 | Rosenkranz et al. | |
| 2011/0110745 A1 | 5/2011 | Shih | |
| 2011/0217145 A1 | 9/2011 | Kochheiser et al. | |
| 2011/0280634 A1 | 11/2011 | Lai | |
| 2012/0251268 A1 | 10/2012 | Yu | |
| 2012/0294693 A1 | 11/2012 | Gonciarz et al. | |

FOREIGN PATENT DOCUMENTS

| | | |
|---|---|---|
| DE | 8329783 U1 | 6/1985 |
| DE | 4439535 A1 | 5/1996 |
| DE | 29621922 U | 4/1998 |
| DE | 19846993 A1 | 4/2000 |
| DE | 202004011145 U1 | 9/2004 |
| DE | 202005006493 U1 | 6/2005 |
| DE | 102008048703 A1 | 3/2010 |
| DE | 102008057678 A1 | 5/2010 |
| DE | 202010016409 U | 2/2011 |
| DE | 202011100618 U1 | 9/2011 |
| EP | 0012441 A1 | 6/1980 |
| EP | 1411252 A2 | 4/2004 |
| EP | 2092995 A2 | 8/2009 |
| EP | 2289647 A1 | 3/2011 |
| EP | 2317159 A1 | 5/2011 |
| GB | 2227540 A | 8/1990 |
| GB | 2235744 A | 3/1991 |
| JP | 2002349528 A | 12/2002 |
| WO | 93/23680 | 11/1993 |

OTHER PUBLICATIONS

DIBT, Approval communication for Reg. No. Z-9.1-564, Jul. 1, 2008.

International Search Report and Written Opinion mailed Jul. 1, 2014, in International Patent Appl. No. PCT/US2014/031324 filed Mar. 20, 2014.

Amendment dated Mar. 31, 2015, in U.S. Appl. No. 13/850,606, filed Mar. 26, 2013.

Office Action dated Apr. 24, 2015, in U.S. Appl. No. 13/850,606, filed Mar. 26, 2013.

Amendment dated Jul. 24, 2015, in U.S. Appl. No. 13/850,606, filed Mar. 26, 2013.

Office Action dated Sep. 15, 2015, in U.S. Appl. No. 13/850,606, filed Mar. 26, 2013.

Amendment dated Mar. 15, 2016, in U.S. Appl. No. 13/850,606, filed Mar. 26, 2013.

Office Action dated May 5, 2016, in U.S. Appl. No. 13/850,606, filed Mar. 26, 2013.

(56) References Cited

OTHER PUBLICATIONS

Restriction dated Oct. 31, 2014, in U.S. Appl. No. 13/850,606, filed Mar. 26, 2013.
International Preliminary Report on Patentability dated Oct. 8, 2015, in International Appl. No. PCT/US2014/031324 filed Mar. 20, 2014.
International Search report and Written Opinion dated Dec. 4, 2015, in International Appl. No. PCT/US2015/050918 filed Sep. 18, 2015.
gotice of Allowance dated Jul. 19, 2016, in U.S. Appl. No. 14/493,029, filed Sep. 22, 2014.
Amendment dated Jul. 28, 2016, in European Patent Appl. No. 147167423 filed Mar. 20, 2014.
Amendment dated Nov. 7, 2016, in U.S. Appl. No. 13/850,606, filed Mar. 26, 2013.

* cited by examiner

C - C

B - B

A - A

E - E

D - D

F - F

VARIABLE THREAD FASTENER

CLAIM OF PRIORITY

This application is a continuation-in-part of U.S. patent application Ser. No. 13/850,606 filed Mar. 26, 2013 entitled "VARIABLE THREAD KNURL FASTENER", inventor Jeremy Scott Park, and claims priority thereto.

BACKGROUND

Fastener designs have been used to improve specific characteristics fasteners in different materials. Ultimately, the fastener needs to bind one material to another securely and efficiently. Screw-type fasteners generally include a threaded shank with a pointed tip at one end thereof and a head at the other end. The head has a recess for accepting a driver tip. Some heads are designed to be recessed in a fastened material, while others are designed to embed into the material so that the head is flush with a surface of the bound material.

SUMMARY

Technology is described herein which provides a unique fastener. The fastener includes a shank having a blunt leading end at a first end and a head at a second end. A contiguous helical thread formed from the tip toward the second end with a first, symmetric thread angle extending from and beginning at the first end and extending toward the second end, and a second thread angle contiguous with the first thread angle. The first thread angle is greater than the second thread angle and the thread with the symmetric thread angle includes a serrated edge.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
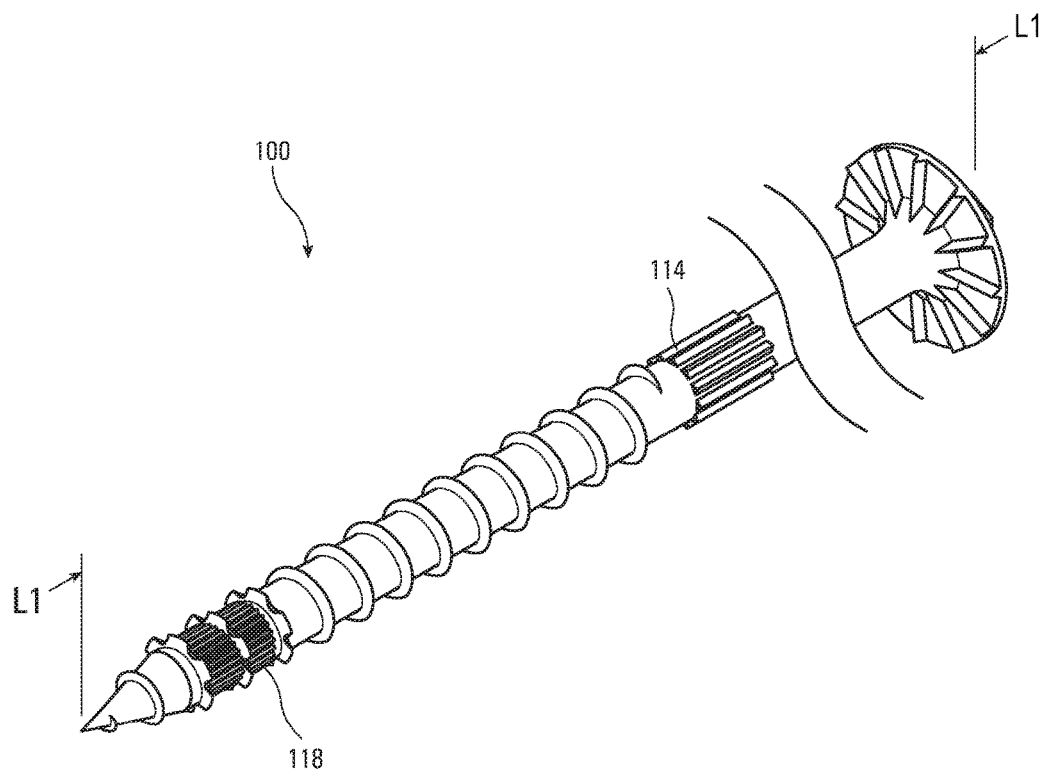
FIG. 1 is a perspective view of a first embodiment of a fastener in accordance with the present technology.
Figure 2:
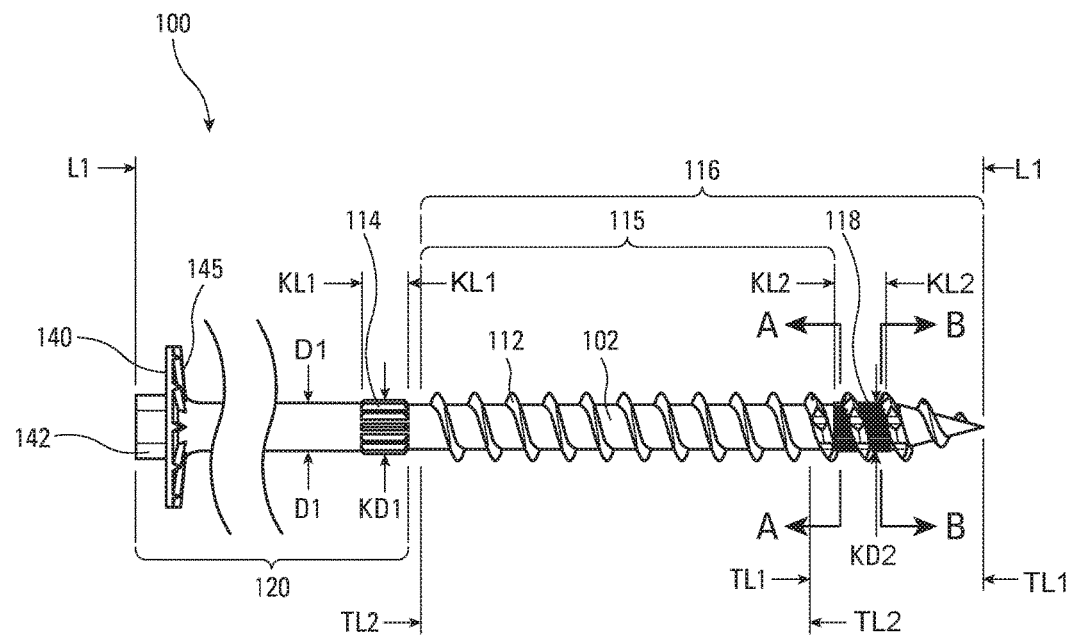
FIG. 2 depicts a plan view of a first embodiment of a fastener in accordance with the present technology.
Figure 3:
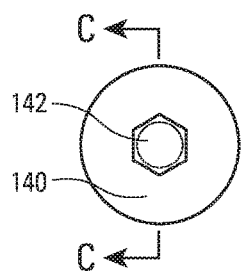
FIG. 3 depicts an end view.
Figure 4:
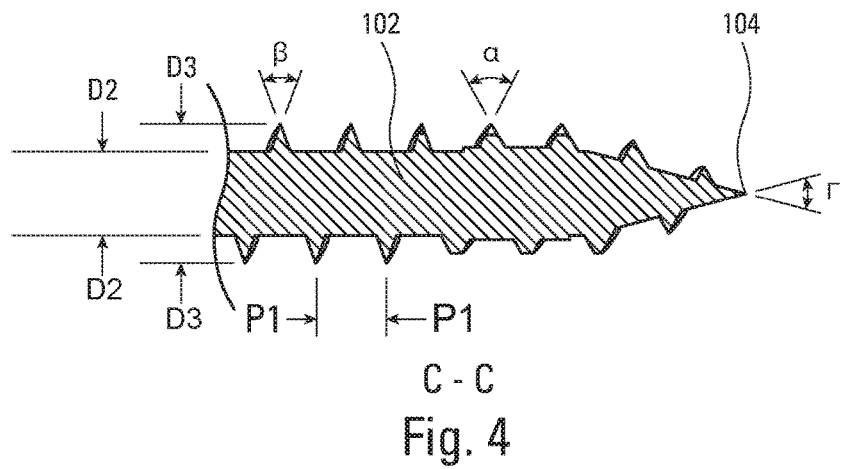
FIG. 4 partial cut-away view along line C-C of FIG. 3.
Figure 5:
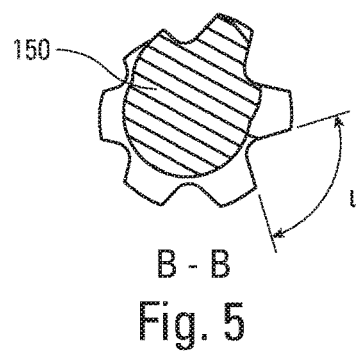
FIG. 5 is a cross-section view along line B-B in FIG. 1.
Figure 6:
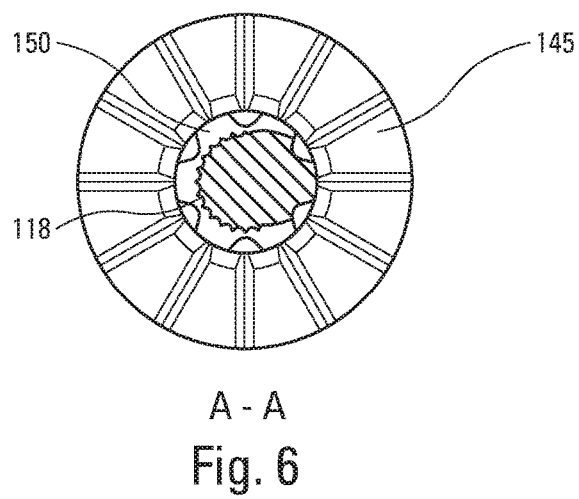
FIG. 6 is a cross section view along line A-A in FIG. 1.
Figure 7:
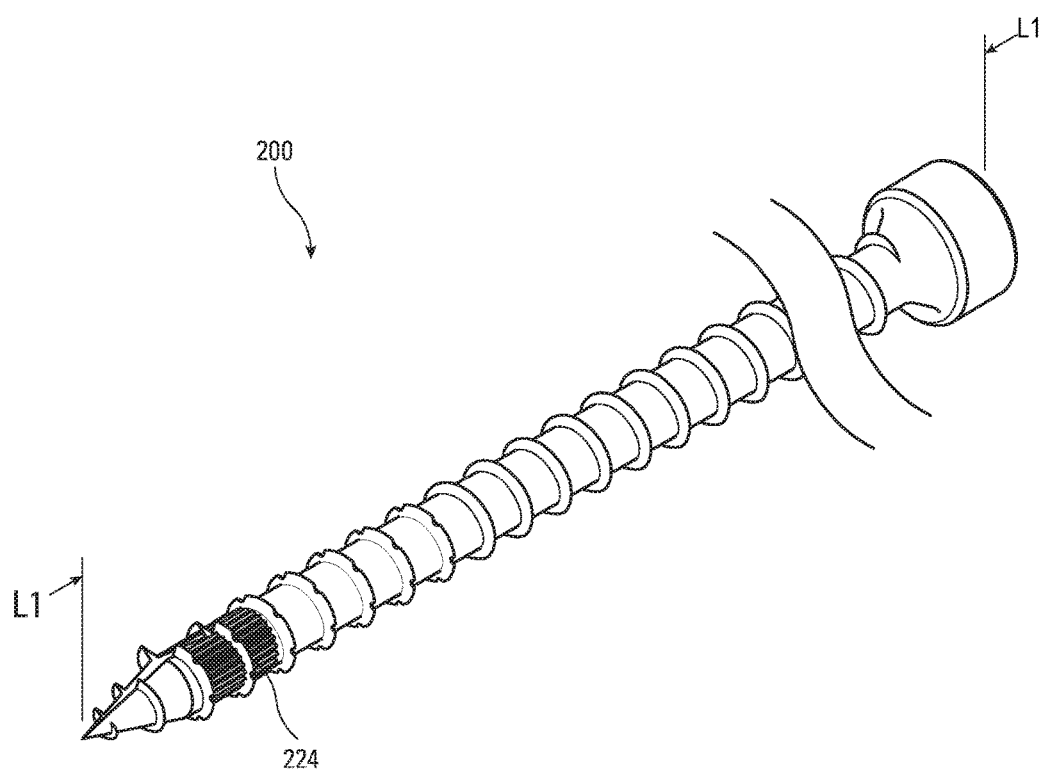
FIG. 7 is perspective view of another embodiment of the fastener in accordance with the present technology.
Figure 8:
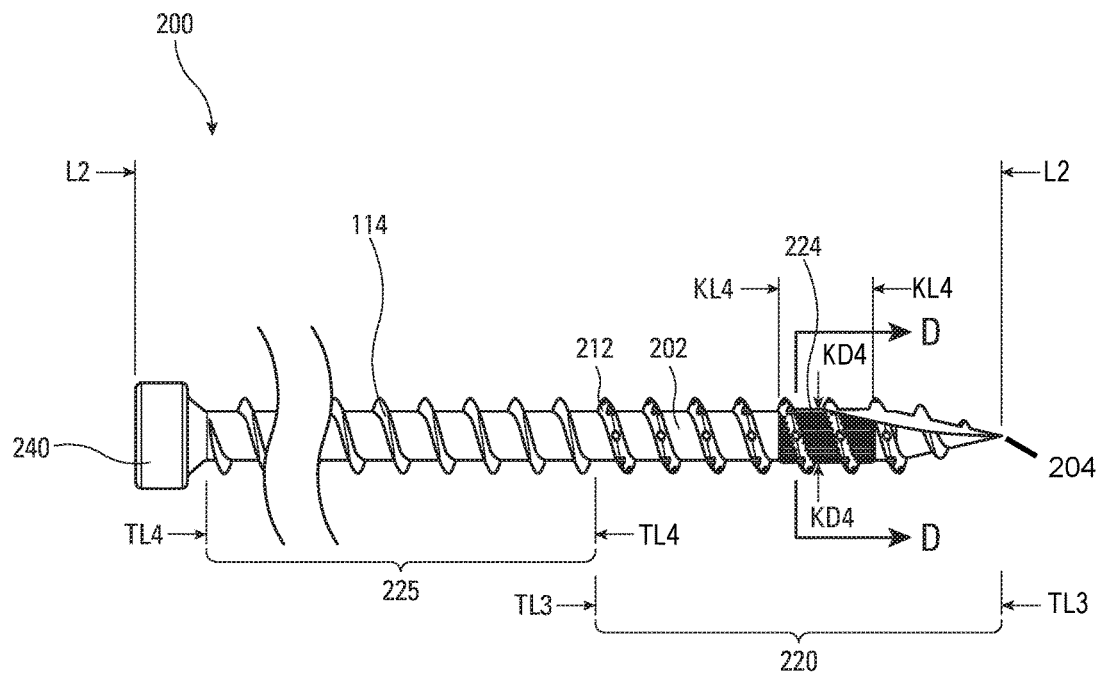
FIG. 8 depicts a plan view of a second embodiment of a fastener in accordance with the present technology.
Figure 9:
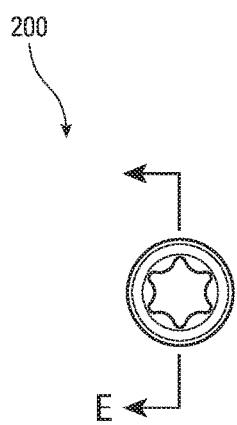
FIG. 9 is an end view of the fastener of FIG. 7.
Figure 10:
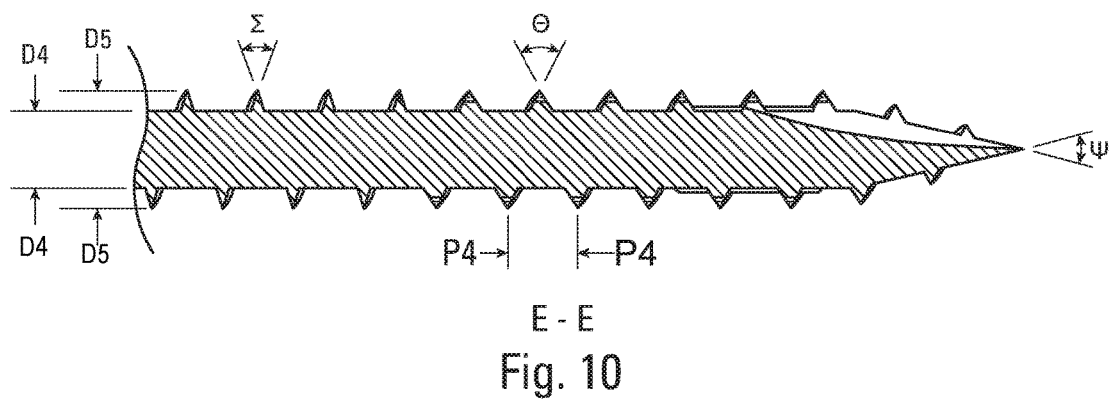
FIG. 10 depicts a partial cut-away view along line E-E in FIG. 9.
Figure 11:
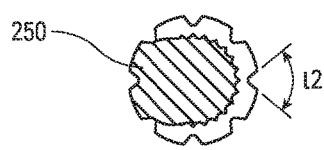
FIG. 11 is a cross section view along line D-D in FIG. 9.

The technology described herein is a fastener having features allowing securing elements in wood, composite or other material and providing improved performance.

The technology includes a threaded fastener having a varied thread angle. A first portion of the thread is formed with a first thread angle and a second portion of the thread is formed with a second thread angle. In one embodiment, the first thread angle is greater than the second and is formed in the thread at the leading or tip end of the fastener.

In one embodiment, the fastener includes a shank having a blunt leading end at a first end and a head at a second end. A contiguous helical thread formed from the tip toward the second end with a first, symmetric thread angle extending from and beginning at the first end and extending toward the second end, and a second thread angle contiguous with the first thread angle. The first thread angle is greater than the second thread angle and the thread with the symmetric thread angle includes a serrated edge In some embodiments, one or more knurls are provided in the shaft in the threaded or unthreaded regions of the fastener. The thread may be serrated or jagged over one or more portions of the fastener, including the area of the first thread angle. Various embodiments of variable thread knurl fasteners are described herein. One embodiment of the fastener includes a shank having a first region with a generally cylindrical cross-section with a helical thread, followed by a thread-free shank section. The first section has a first portion with a first thread angle and a second portion with a second thread angle. In one embodiment, this is combined with a "type 17" screw point.

In one embodiment, one or more knurl sections and one or more thread angle changes may be provided in the fastener. In one embodiment, the pitch of the thread is constant. In one embodiment the thread extends over the entire shank and in another embodiment, the thread covers only a partial length of the shank. The cross-sections may be formed to a length approximately equal to the pitch of the helical thread.

A first embodiment of the fastener technology will be described with respect to FIGS. 1-6.

The fastener 100 of FIGS. 1-5 includes a shank 102 having a pointed tip 104 at one end thereof and a head 140 at another end. The shank may be formed of galvanized steel, though other materials may be used. The first section 116 extends from pointed tip 104 to second section 120. The body of the shank has a minor diameter D2 (FIG. 3) in first section 116. The second section 120 has a diameter D1, which may be greater than or equal to D2.

The shank in region 120 has a cylindrical cross-section and in this embodiment comprises an unthreaded region.

Two knurls 114 and 118 are provided in the respective second region 120 and first region 116. Knurl 118 has a knurl diameter KD2 which is 1.1-1.3 times the minor diameter D2. Knurl 114 has diameter KD1 which may be the same as or different than diameter KD2. In one embodiment, KD1 has a diameter which is 1.1-1.3 times shank diameter D1 and which is the same as or greater than KD2 by a ratio of 1.0-1.2.

A first section 116 of the shank includes a helical thread 112 formed on the shank 102 extending to the tip 104. The shank in section 116 has a generally cylindrical shank diameter D2 and the thread has a diameter D3 which is approximately 1.5-1.75 times D2. The thread 112 has an effective thread height above the shank in the section 116 equivalent to ((D3-D2)/2) and a pitch P.

In the embodiment 100, two knurls (114, 118) are provided, but in other embodiments only one knurl is used. Where one knurl is used, the knurl may be in the threaded section (116) or the unthreaded section (120). The knurls may be the same or different sizes, as described above. Each knurl has a knurl length KL. Knurl 114 has a knurl length KL1 and knurl 118 has a knurl length KL2. KL1 and KL2 may be the same or different. In the embodiment of FIGS. 1-5 the length of KL1 to KL2 may vary over a ratio of KL1:KL2 of about 1.5-0.9.

In one embodiment, thread 112 is divided into a first length (or region) TL1 and a second length (or region) TL2, with TL1 extending from point 104 toward second section 120. The thread in length TL1 includes a serrated edge defined by a plurality of teeth 150 illustrated in FIG. 4. The Teeth may be formed by 90 degree gaps spaced at 60 degree intervals in thread 112. Other serration formations may be used. Length TL1 extends just beyond knurl 118 in section 116 of shaft 102.

In a further unique aspect of the technology, the thread has a variable thread angle along the length of section 116. A first potion of the thread in length TL1 has a thread angle α while a second portion of the thread has a thread angle β, where α is greater than β. In one embodiment, α is 55-65 degrees and β is 35-45 degrees. The thread angle β may be maintained through length TL2. In one embodiment TL2 is greater than TL1 by about 2.15-2.5 times.

In various embodiments, the total length L1 of the fastener may vary between 4-12 inches. In such embodiments, for any change in length L1, the length of section 116 remains constant, with a change in the length of section 120 extending the length of the fastener. In such embodiments, a length of section 116 may be about 3 inches and the position of knurl 118 remains adjacent to section 116 irrespective of the length of section 120. Alternatively, additional knurls may be provided in section 116 or section 120.

When constructed in accordance with the foregoing description, the torque required to install a fastener is greatly reduced. Table 1 is a comparison of three different fastener constructions: a standard thread (column C) with no serrations or knurls, a serrated thread (column A) and a thread/knurl/variable thread fastener constructed as in the present description of FIGS. 1-6. (column B) As illustrated therein the average torque required for comparable lengths of penetration into a wood surface was substantially less when both the serrated edge and knurls 114 and 118 were provided.

| | A | | B | | C | |
|---|---|---|---|---|---|---|
| Test No. | Torque @ 4.5" | Penetration | Torque @ 4.5" | Penetration | Torque @ 4.5" | Penetration |
| 1 | 36.3 | 4.496 | 24.5 | 4.472 | 48.1 | 4.514 |
| 2 | 49.0 | 4.496 | 25.3 | 4.502 | 45.6 | 4.508 |
| 3 | 43.1 | 4.496 | 32.1 | 4.532 | 46.4 | 4.520 |
| 4 | 43.1 | 4.508 | 29.6 | 4.514 | 46.4 | 4.490 |
| 5 | 43.9 | 4.490 | 30.4 | 4.484 | 47.3 | 4.514 |
| 6 | 39.7 | 4.520 | 24.5 | 4.472 | 46.4 | 4.526 |
| 7 | 43.9 | 4.490 | 23.6 | 4.490 | 47.3 | 4.490 |

-continued

| | A | | B | | C | |
|---|---|---|---|---|---|---|
| Test No. | Torque @ 4.5" | Penetration | Torque @ 4.5" | Penetration | Torque @ 4.5" | Penetration |
| 8 | 38.0 | 4.502 | 29.6 | 4.520 | 42.2 | 4.502 |
| 9 | 43.1 | 4.520 | 22.8 | 4.484 | 49.0 | 4.508 |
| 10 | 45.6 | 4.520 | 32.9 | 4.520 | 43.9 | 4.502 |
| AVG. | 41.9 | 4.505 | 27.5 | 4.499 | 46.3 | 4.507 |

Head 140 may be any standard head, but in the embodiment of FIGS. 1-6, a hex nut head fastened to a disk 145. The underside of the disk 145 may include nibs which help the disk engage a surface of the product being fastened. In one embodiment, twelve (12) locking teeth or nibs are formed in the bottom surface of the disk.

FIGS. 7-11 illustrate an alternative embodiment of the technology. The fastener is similar to that of FIGS. 1-6 except that the thread runs the entire length of the shaft, the portion of the wider thread region extending from the tip is longer, the serrated section is longer and the fastener includes a "type 17" point. It should be recognized that a type 17 point may be utilized with the embodiment of FIGS. 1-6.

In the embodiment of FIGS. 7-11, a fastener 200 has a total length L2, includes a shank 202 having a first portion 220 and a second portion 225. The first portion includes a tip 204, a serrated portion of thread 212, a thread portion having a thread angle Θ which is larger than a thread angle Σ. Region 220 has a total length TL3 is less than the length TL4 of region 225 by about 3.5-3.8 times. In one embodiment, Θ is 55-65 degrees and is 30-45 degrees.

The shank 202 has a generally cylindrical shank diameter D4 and the thread has a diameter D5 which is approximately 1.4-1.6 times D4. The thread 212 has an effective thread height above the shank equivalent to ((D5-D4)/2) and a pitch P4.

One knurl 224 is provided in the first region 220. Knurl 224 has a knurl diameter KD4 which is 1.002-1.25 times the minor diameter D4. Knurl 224 has a length KL4 which in the embodiment of FIGS. 6-9 is equivalent to two times P4. The knurl length may be shorter or longer.

Helical thread 212 formed on the shank 202 extends from the tip 204 to head 240. In the embodiment, one knurl is provided, but in other embodiments multiple knurls are used. Where one knurl is used, the knurl may be in the threaded section 220 with thread angle Θ, and may be positioned just after the tip reaches diameter D4 in the threaded section (220). If multiple knurls are used, the knurls may be the same or different sizes, as illustrated above.

In one embodiment, thread 212 is divided into a first section 220 of length TL3 and a second section 225 of length TL4, with TL3 extending from point 204 toward second section 225. The thread in length TL3 includes a serrated edge defined by a plurality of teeth 250. The teeth may be formed by 90 degree gaps in thread 112 positioned at 60 degree intervals.

The screw is designed to be a self-boring screw into the material to be fastened. However, a pilot hole may be utilized. In the embodiment discussed with respect to FIGS. 14-17, a pilot hole is used as no boring tip is present.#

A head 240 is provided at the other end of the shank 202. The head comprises hexalobular drive head, but may alternatively take the form of head 240 and/or have, a Phillips recess, a square or other shaped recess formed in the top of the head 240 to receive a driver.

Figure 12:
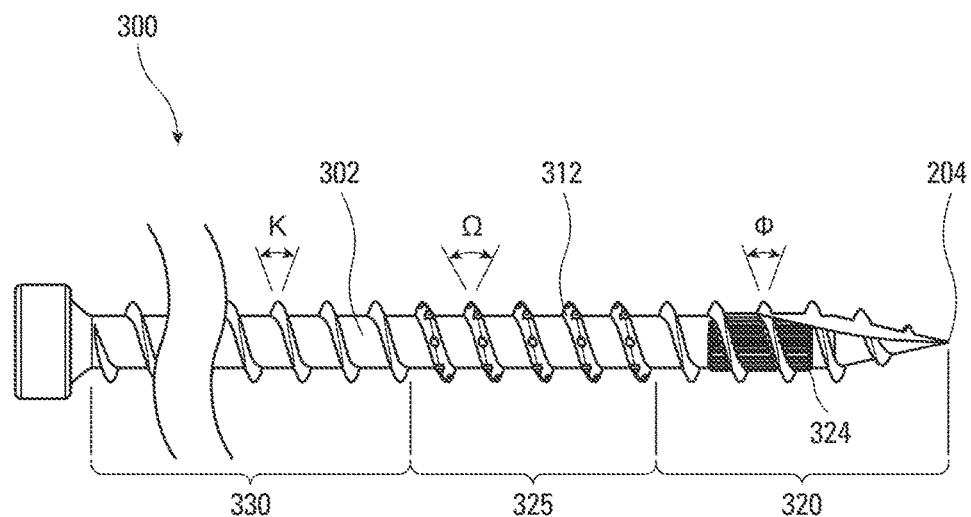
FIG. 12 depicts another embodiment of the fastener in accordance with the present technology.

FIG. 12 illustrates a third embodiment of a fastener 300 wherein a first and second thread angles are used in conjunction with one or more knurls and a serrated edge thread. In this embodiment the thread angle Φ extends for a first portion 320 of the thread, then the thread in portion 325 has a thread angle Ω, and a third portion 330 of the thread has a thread angle K. In one embodiment, K and Φ are equal. In another embodiment, they are different. In one embodiment angle Φ is less than Ω and approximately equal to K. In one embodiment, Ω is 55-65 degrees and K and Φ are between 30-45 degrees.

The thread may extend the entire length of shank 302, or a portion thereof. While only one knurl is illustrated, multiple knurls may be used.

Figure 13:
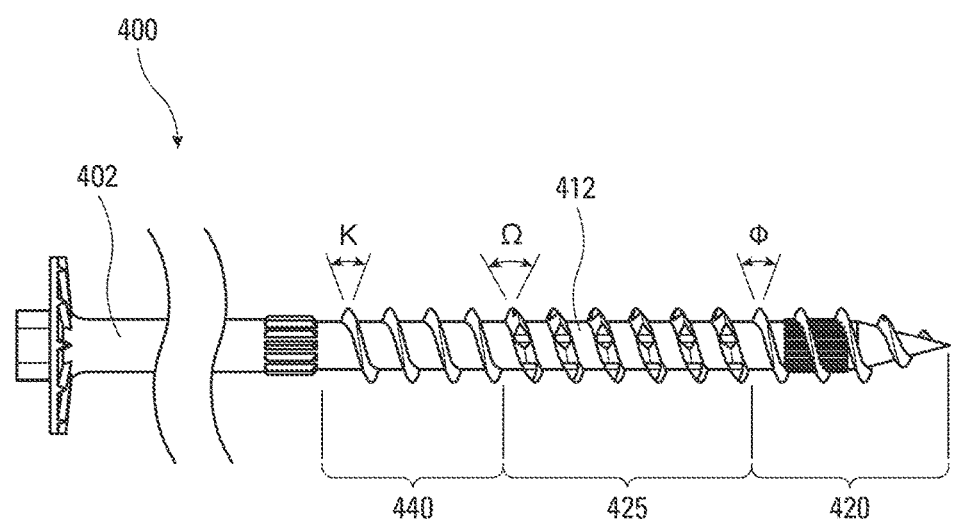
FIG. 13 depicts another embodiment of a fastener in accordance with the present technology.
Figure 14:
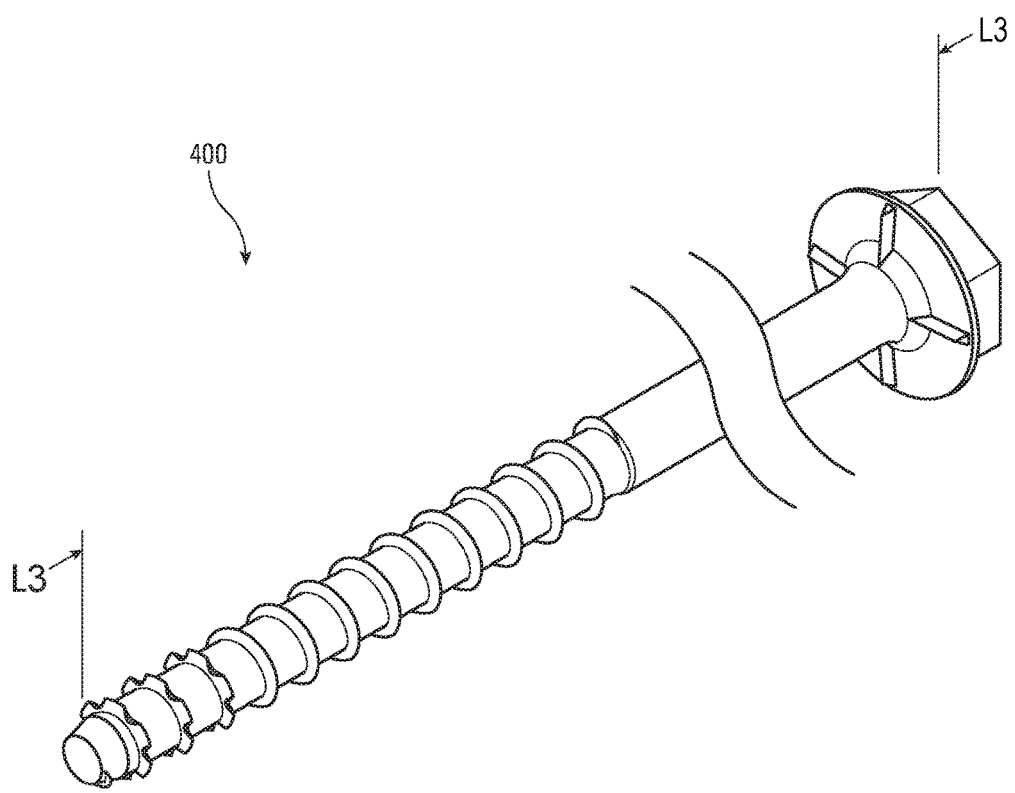
FIG. 14 depicts a plan view of a further embodiment of a fastener in accordance with the present technology.
Figure 15:
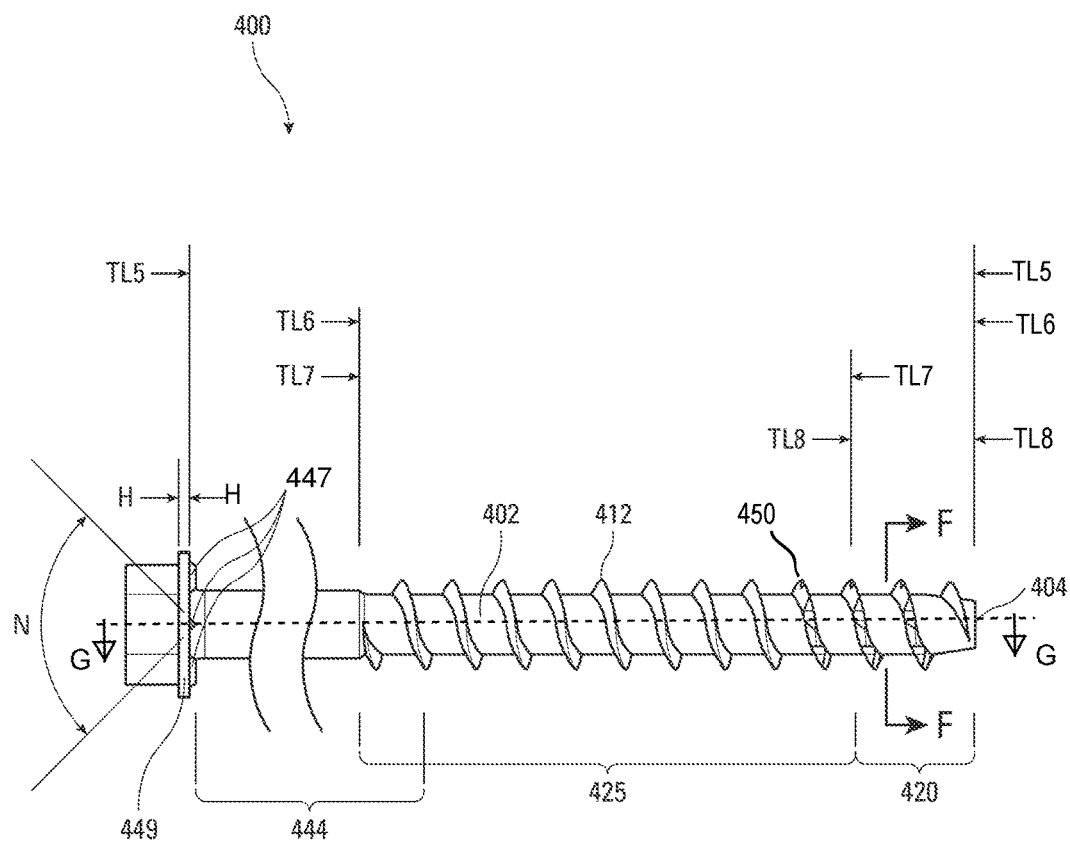
FIG. 15 depicts a plan view of a further embodiment of a fastener in accordance with the present technology.

FIG. 13 illustrates a fourth embodiment of fastener of the present technology. This embodiment is similar to the embodiment of FIG. 10 except that the fastener 400 includes a thread-free section 450, and three thread portions having angles K, Ω and Φ are shown.

FIGS. 14-17 illustrate another alternative embodiment of the technology. The fastener included multiple thread angle regions in the thread and a flat point on one end.

Figure 16:
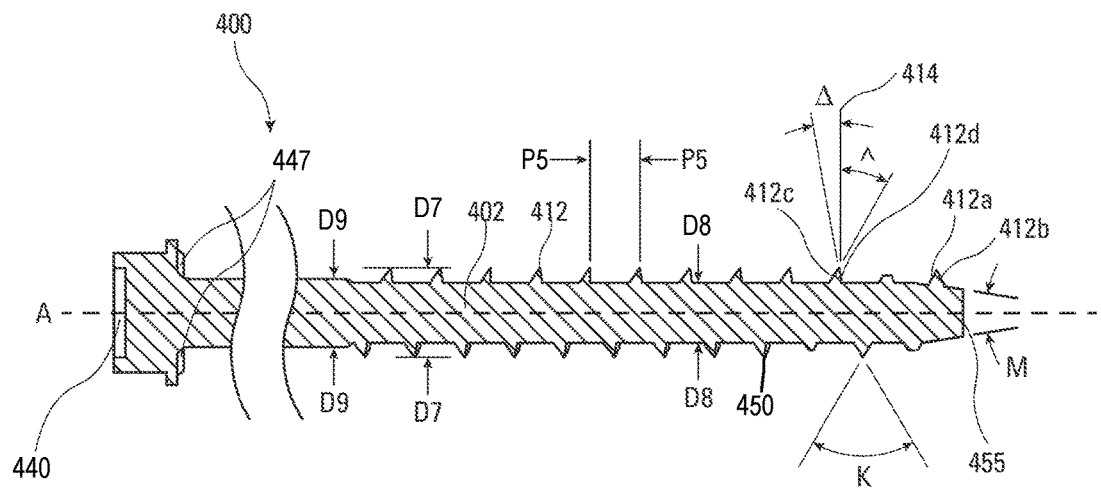
FIG. 16 depicts a partial cutaway view along section G-G of a further embodiment of a fastener in accordance with the present technology.

In the embodiment of FIGS. 14-17, a fastener 400 has a total length L3 (FIG. 14), and includes a shank 402 having a length TL5 between a first end 404 and head 440. Helical thread 412 a first portion 420 and a second portion 425. The first portion runs from first end 404 and includes a serrated portion of thread 412 in region 420. As illustrated in FIG. 16, thread portion 420 has a symmetrical cross-section relative to the surface of shaft 402, with each flank 412a, 412b of the thread having the same length and forming an angle ½ K with a surface of the shank 402. Second portion 425 of thread 412 is not serrated and is comprised of an asymmetric thread formed so the leading flank 412d is formed at a different angle than a trailing flank 412c. Lead flank 412d forms an angle Δ with line 414 perpendicular to an axis A formed by shank 402. Trailing flank 412c forms an angle Λ relative to a line 414 perpendicular to an axis A. Angle K may be in a range of about 55°-65° and in one embodiment about 60°. Angle Δ may be in a range 7°-13° degrees and in one embodiment is about 10°. Angle Λ may be in a range of 27°-33° and in one embodiment is about 30°. As such, the portion of helical thread 412 in region 425 has a smaller cross-section (40° total, in one embodiment) than the cross-section of the thread in region 420.

The total length TL6 of the shank is about 4 to 6 times the length TL8 of region 420. Region 425 may be anywhere from 3-5 times as long as total length TL8 of region 420.

The shank 402 has a generally cylindrical shank diameter D9, a minor diameter D8 and a major diameter D7 defined by thread 412. The Major diameter D7 is approximately 1.3-1.5 times D8 and 1.25-1.4 times D9. The thread 412 has an effective thread height above the shank equivalent to ((D7-D8)/2) and a pitch P5. The pitch P5 is about 0.5 to 0.6 of the major diameter D7.

Figure 17:
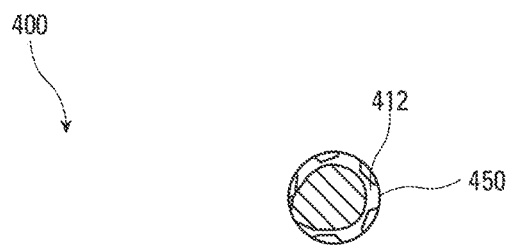
FIG. 17 depicts a cross sectional view along line F-F of FIG. 15.

Helical thread 412 formed on the shank 402 extends from the first end 404 to a thread-free region 444. In one embodiment, the thread 412 in region 420 includes a serrated edge defined by a plurality of teeth 450. As illustrated in FIG. 17, the serrated edge may be formed by five equally spaced teeth about at 360 Degree rotation of thread 412, with a tooth depth by 90 degree gaps in thread 412 positioned at 60 degree intervals. The teeth may be formed by forming gaps approximately two-thirds of the depth of the thread height with a 120°-135° entry and exit angle.

First end 404 includes a blunt leading end defined by the first end 404 of the shank and surface 455. First end 404 is formed into a leading edge by an angling of the shank in region 420 as defined by angle M and terminating in surface 455. Angle M may be in a range of 10°-20°.

In the displayed embodiment of FIGS. 14-17, no knurls are provided, but in other embodiments one or more knurls are used. If multiple knurls are used, the knurls may be the same or different sizes, as illustrated above.

A head 440 is provided at the other end of the shank 402. The head comprises hexalobular drive head, but may alternatively have, a Phillips recess, a square or other shaped recess formed in the top of the head 240 to receive a driver. Head 440 may be provided with a plurality of nibs 447 on the underside of washer 449. Each rib formed of a 90 degree angle N and extending a distance H below the washer 449. In one embodiment, four nibs are provided 90 degrees apart on washer 449. More or fewer (or no) nibs may be provided in various embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fastener, comprising:
   a shank having a first end and a second end defining a length; and
   a thread provided on the shank, the thread including a first region having a first thread angle which is constant over multiple turns in the first region and a second region with a second, different thread angle which is constant over multiple turns in the second region, each thread angle formed by a leading side and a trailing side of the thread on the shaft, at least a portion of the thread having said first thread angle having a serrated edge;
   wherein the first end of the shank is adapted to enter a structure to be secured and the second end includes a head.

2. The fastener of claim 1 wherein the first end has a blunt end.

3. The fastener of claim 2 wherein the first region begins at and extends from the blunt end toward the second end, the shank has a length, and the shank length is about four to six times a length of the first region.

4. The fastener of claim 3 wherein the thread is contiguous between the first and the second regions.

5. The fastener of claim 3 wherein the second region is adjacent to the first region and extends from the first region to said second end, and said second region has a length which is about 3-5 times the length of the first region.

6. The fastener of claim 1 wherein first region of the thread has a symmetrical cross-section and the second region has an asymmetrical cross section.

7. The fastener of claim 6 wherein the second region of the thread has said first flank as a leading flank and said first flank is formed at an angle relative to normal of an axis defined by the shank which is less than an angle formed by the second flank in said second region to normal of said axis.

8. The fastener of claim 7 wherein the angle of the second flank relative to the first flank in said second region is three times the angle of the first flank.

9. The fastener of claim 1 wherein the thread is formed by a first flank and a second flank, and the first thread angle is formed by the first flank and a second flank in the first region is greater than the second thread angle.

10. The fastener of claim 1 wherein the shank further includes a threadless region adjacent to the second region of the thread.

11. A fastener, comprising:
a shank having lead end at a first end and a head at a second end;
a continuous helical thread having a symmetric thread angle which is constant over multiple turns in a first region adjacent to the first end and an asymmetric thread angle which is constant over multiple turns in a second region, each thread angle formed by a leading side and a trailing side of the thread on the shank, the first region thread having a first thread angle greater than a second thread angle of the second region, at least a portion of the contiguous helical thread including a serrated edge.

12. The fastener of claim 11 wherein the first end includes a lead end having a blunt end formed by a flat surface and an angled portion of the shank.

13. The fastener of claim 11 wherein the shank further includes a threadless region adjacent to the second region of the thread.

14. The fastener of claim 11 the shank has a generally cylindrical shank diameter, a minor diameter in the first and second regions and a major diameter defined by thread, wherein the major diameter is approximately 1.3-1.5 times the minor diameter.

15. The fastener of claim 14 wherein the thread has a pitch which is about 0.5 to 0.6 of the major diameter.

16. The fastener of claim 11 wherein the first thread angle is about 1.5 times the second thread angle.

17. The fastener of claim 16 wherein the second region of the thread has said first flank as a leading flank and said first flank is formed at an angle relative to normal of an axis defined by the shank which is less than an angle formed by the second flank in said second region to normal of said axis.

18. A fastener, comprising:
a shank having blunt end in an angled portion of the shank at a first end and a head at a second end, the first and second end defining a length;
a contiguous helical thread formed from the blunt end toward the second end, the contiguous helical thread having a portion with first thread angle extending from and beginning at the first end and extending toward the second end, the contiguous helical thread with the first thread angle having a serrated edge, the thread further including a portion with a second thread angle, each thread angle formed by a leading side and a trailing side of the thread on the shank, each thread angle maintained over multiple turns in each portion, the first thread angle greater than the second thread angle.

19. The fastener of claim 18 wherein the first thread angle is symmetric and the second thread angle is asymmetric.

* * * * *